United States Patent [19]

Moergelin et al.

[11] Patent Number: 5,631,625
[45] Date of Patent: May 20, 1997

[54] ELECTRIC CIRCUIT FOR USE WITH A HAZARD WARNING SYSTEM HAVING AN ELEMENT WHICH IS OPERABLE INTERMITTENTLY

[75] Inventors: Matthias Moergelin, Boeblingen; Joachim Engler, Heilbronn, both of Germany

[73] Assignee: Mercedes-Benz AG, Stuttgart, Germany

[21] Appl. No.: 405,183

[22] Filed: Mar. 16, 1995

[30] Foreign Application Priority Data

Mar. 16, 1994 [DE] Germany ............... 44 08 959.7

[51] Int. Cl.$^6$ ................................................. B60Q 1/52
[52] U.S. Cl. ................................................. 340/471; 340/475
[58] Field of Search .............................. 340/471, 475, 340/468, 458, 472; 315/200 A, 209 R

[56] References Cited

U.S. PATENT DOCUMENTS

| | | | |
|---|---|---|---|
| 3,165,716 | 1/1965 | Epstein | 340/471 |
| 3,299,402 | 1/1967 | Schilling | 340/471 |
| 3,447,130 | 5/1969 | Skinner et al. | 340/471 |
| 3,824,542 | 7/1974 | Schorter | 340/475 |
| 3,913,066 | 10/1975 | Kehry et al. | 340/471 |
| 4,037,195 | 7/1977 | Wojslawowicz | 340/471 |
| 5,072,210 | 12/1991 | Kimmelman | 340/458 |

FOREIGN PATENT DOCUMENTS

| | | |
|---|---|---|
| 2634433 | 1/1990 | France . |
| 2813738 | 10/1979 | Germany . |
| 1321340 | 6/1973 | United Kingdom . |
| 1551014 | 8/1979 | United Kingdom . |

OTHER PUBLICATIONS

Japanese Abstract No. 61-202946, vol. 11, No. 34 (M-558), Sep. 8, 1986.

*Primary Examiner*—Brent A. Swarthout
*Attorney, Agent, or Firm*—Evenson, McKeown, Edwards & Lenahan, P.L.L.C.

[57] ABSTRACT

A motor vehicle hazard warning system circuit has a flasher unit, at least one flasher lamp which is connected to a flasher-unit driver output, a hazard warning activation switch which engages in an actuation line, which activates a hazard warning mode of the flasher unit, and a hazard warning monitoring lamp which is actuated in each case by the flasher unit, specifically so as to flash in an active hazard flashing mode, and in an inactive flashing mode according to a dimmed vehicle search light signal, via a separate output driver. A connection line for the monitoring-lamp control device is connected on the control drive-side to the driver output for the at least one element which can be operated intermittently, and one multi-level switch with at least two permanent switched positions is provided, which multi-level switsh is looped with a first switching level into the actuation line, which activates the intermittent mode of the control device and is looped with a second switching level into the connection line for the monitoring-lamp control device. The intermittent mode is activated via the one switching level in one of the switched positions of the multi-level switch and the electrical connection between the monitoring lamp and the flasher-unit driver output is closed in synchronism therewith via the second switching level.

3 Claims, 1 Drawing Sheet

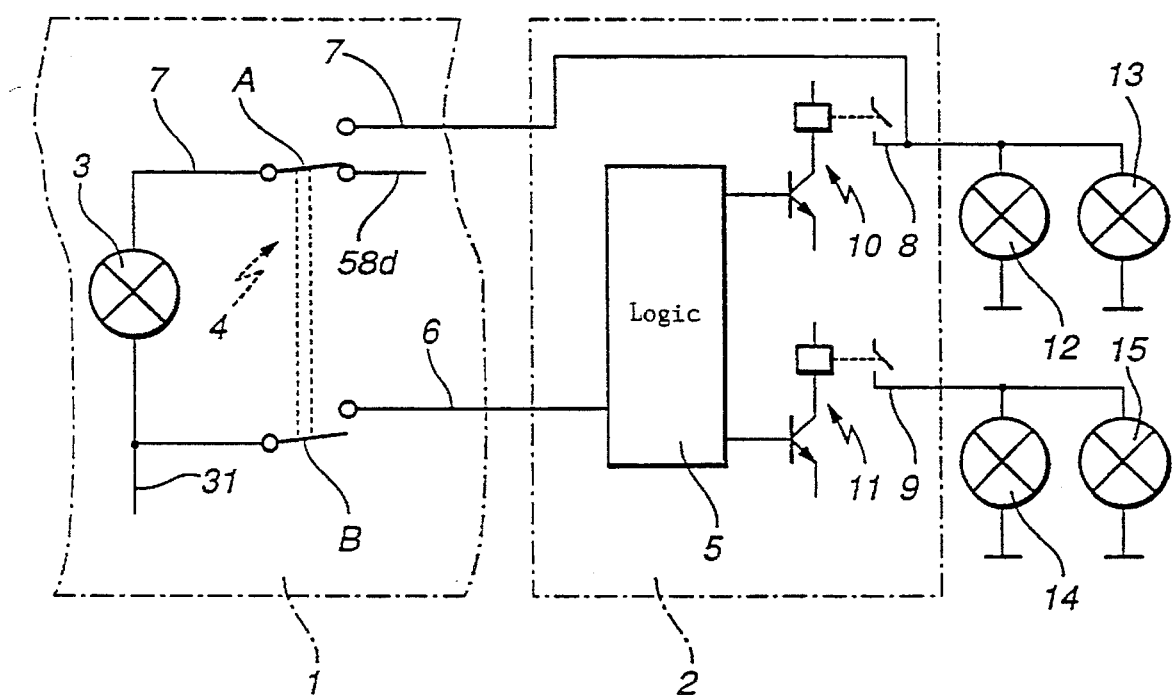

ELECTRIC CIRCUIT FOR USE WITH A HAZARD WARNING SYSTEM HAVING AN ELEMENT WHICH IS OPERABLE INTERMITTENTLY

BACKGROUND AND SUMMARY OF THE INVENTION

The invention relates to an electric circuit for a system having an element which can operate intermittently, in particular for a hazard warning system of a motor vehicle. The circuit includes a control device, at least one element which is connected to a driver output of the control device and can be operated intermittently, an activation switch which engages in a control line for controlling device activation, and a monitoring lamp which, during the active intermittent mode of the element, is operated by the control device in a first, intermittent state, via a connection line for a monitoring-lamp control device, and during a non-activated mode of the element, the monitoring lamp is in a second operating state which is different from the first.

A circuit of this kind for a motor vehicle hazard warning system is provided, for example, in known Mercedes-Benz series produced vehicles. In this conventional hazard warning system circuit in which a so-called hazard warning switch serves as an activation switch, in the housing of which switch the hazard warning monitoring light is integrated, the monitoring light is continuously operated by the flasher unit as a control device via a separate short-circuit-proof output driver unit. This is done specifically so as to flash during the active flasher mode of the flasher lamp and during the inactive flasher mode according to the signal on a vehicle search light line which is fed to the flasher unit. Using this signal, in the inactive flasher lamp mode the monitoring light is operated in a dimmed continuously lit state when the external lights of the vehicle are switched on while the monitoring light remains switched off when the exterior lights of the vehicle are switched off. Both a ground line for the hazard warning monitoring light and a positive voltage supply for the switch itself are fed to the housing of the hazard warning switch in order to operate the flasher unit so as to activate the hazard warning mode.

A circuit for a flasher unit in which a hot wire switch acts as clock pulse generator and a monitoring lamp is provided in addition to the flasher lamps is known from German Patent Document DE 28 13 738 1A. Between the hot wire switch on the one hand and the lamps which are all connected to a terminal at a common ground potential on the other, a reed switch is arranged in such a way that the monitoring lamp is connected via the reed switch contact, and the flasher lamps are connected via a flasher switch and the exciter winding of the reed switch, to the switching tongue of a clock switch which is mechanically controlled by the hot wire switch.

There is therefore needed an electric circuit for a system of the above-mentioned type which permits the monitoring light to be operated in the desired operating modes with a low outlay in terms of circuit technology.

These needs are met according to the present invention which provides a circuit including a control device, at least one element which is connected to a driver output of the control device and can be operated intermittently, an activation switch which engages in a control line for control device activation, and a monitoring lamp which, during the active intermittent mode of the element, is operated by the control device in a first, intermittent state, via a connection line for a monitoring-lamp control device, and during a non-activated mode of the element, the monitoring lamp is in a second operating state which is different from the first. The connection line for the monitoring-lamp control device is connected on the control device-side to the driver output for the at least one element which can be operated intermittently. The activation switch is a multi-level switch which has at least two permanent switched positions and is looped with a first switching level (B) into the control line for the control device activation and with a second switching level (A) into the connection line for the monitoring-lamp control device. The intermittent mode of the element is activated in one of the switched positions of the activation switch via the first switching level and the switching disconnection of the connection line for the monitoring-lamp control device is cancelled synchronously therewith via the second switching level.

By virtue of the connection of the monitoring light to a driver output of the control device, the driver output being provided for the intermittently element, a separate output driver unit in the control device for the monitoring light is not required. The arrangement of the multi-level switch with at least two permanent switched positions as an activation switch permits an automatic, simultaneous switching over of the mode of operation for the monitoring light depending on whether an active, intermittent operation is requested or not.

In an advantageous embodiment of the invention, the monitoring light of the control device is arranged remotely in a housing cf the activation switch, i.e. in the case of a hazard warning system in the housing of the hazard warning activation switch.

A further embodiment of the present invention provides for the use of the novel circuit for a hazard warning system of a motor vehicle which has a dimmed vehicle search light line as part of its vekicle electrical system. Here, there is a provision for the flasher monitoring light to be electrically connected to the dimmed vehicle search light line when the hazard warning mode is not activated.

Other objects, advantages and novel features of the present invention will become apparent from the following detailed description of the invention when considered in conjunction with the accompanying drawings.

BRIEF DESCRIPTION OF THE DRAWING

The single figure is a diagrammatic block circuit diagram of an electric circuit for a motor vehicle hazard warning system.

DETAILED DESCRIPTION OF THE DRAWING

The hazard warning system shown contains as a control device a flasher unit 2 which is indicated by dot-dash lines. The flasher unit 2 contains a control logic component 5. The control logic component 5 controls, via its two outputs, in each case one outout driver unit 10, 11 of the flasher unit 2. The output driver units 10, 11 are indicated diagrammatically in the figure having in each case one relay and one switching transistor. Alternatively, other ways of implementing the output driver units are also possible. The two switching terminals form in each case flasher-unit driver outputs 8, 9 to which in each case two flasher lamps 12, 13 or 14, 15 are connected in parallel as elements which can be operated intermittently. Of course, even more flasher lamps could be provided.

In order to provide a hazard warning function, a hazard warning activation switch 4 is provided as an activation switch in the form of a two-level switch with two switching levels (A, B) which can be switched over synchronously. The activation switch is arranged in a housing 1, which is also indicated by a surrounding dot-dash line, in which a hazard warning monitoring lamp 3 is integrated in a customary manner.

The hazard warning activation switch 4 is realized as a latched switch having two permanent switched positions. The input side of the switching elements of the one switching level (B) is connected to a ground line 31, as is a terminal of the hazard warning monitoring lamp 3. While, on the output side, one terminal of this switching element of the one switching level (B) remains unassigned, the other output terminal is connected via a connection line 6 to a control input of the control logic 5 in the flasher unit 2. This is done in such a way that the control logic 5 activates the hazard warning mode in which all the flasher lamps (12 to 15) flash with a synchronized rhythm as soon as this logic control input is connected to ground.

The switching element of the other switching level (A) is connected on the input side to the other terminal of the hazard warning monitoring lamp 3. On the output side, one of the two switching terminals is connected to a dimmed vehicle search light line 58d while the other terminal is connected to one 8, or alternatively to the other 9, of the two hazard warning driver outputs 8, 9 via a second connection line to the flasher unit 2. This second connection line forms, together with the input-side connection line between the switching level (A) and the hazard warning monitoring lamp 3, a connection line 7 for the monitoring-lamp flasher unit. The connection line 7 can be disconnected and connected again by means of the aforesaid switching element.

The hazard warning switch housing 1 is integrated in a switch module strip on the dashboard of the vehicle. The switch module strip already has a ground connection 31 and a connection to the dimmed vehicle search light line 58d so that separate lines are not required for these two feeders. Alternatively of course, separate feed lines of this kind can be led to the housing of the hazard warning switch. With this dimmed vehicle search light line 58d which is known from conventional flasher systems, the so-called 58d terminal of the vehicle electrical system, a pulsed signal is transmitted when the exterior lights of the vehicle are switched on, by means of which signal the hazard warning monitoring lamp is operated in a dimmed continuously lit state while the monitoring lamp remains switched off when the external lights of the vehicle are switched off, in each case with the proviso that a hazard warning mode is not activated.

The mode of operation of the hazard warning system circuit constructed in this manner will be explained below in greater detail.

As long as the hazard warning switch 4 assumes the position shown in the Figure, the ground line 31 is disconnected from the corresponding control input in the flasher unit 2 on the switching level (B) which activates the hazard warning mode, so that the flasher unit 2 does not activate a hazard warning mode. The hazard warning monitoring lamp 3 is connected via the switching element of the switching level(A) which controls the monitoring lamp to the dimmed vehicle search light signal of the 58d terminal, by means of which vehicle search light signal the hazard warning monitoring lamp 3 remains switched off when the external lights of the vehicle are deactivated, and is operated for the dimmed continuous light when the external lights of the vehicle are activated. The connection line 7 for the monitoring-lamp flasher unit is simultaneously disconnected.

When the hazard warning activation switch 4 is switched over from the switched position shown in the figure into the other permanent switched position as a result of corresponding activation, the switching element in the two switching levels are switched over synchronously. The connection line 6 to the corresponding logic control input is connected to ground 31 via the switching level (B) which activates the hazard warning mode. As a result of which, the control logic 5 activates the hazard warning mode by correspondingly actuating the flasher-unit output driver units 10, 11 connected on the output side. Here, the two relays of the driver units 10, 11 open and close with a synchronous rhythm so that the flasher lamps (12 to 15) are switched off and on simultaneously in each case. Moreover, the output signal of the one flasher-unit output driver unit 10 additionally feeds the hazard warning monitoring lamp 3 via the connection line 7. This is because, in this position of the hazard warning activation switch in which the logic control input which activates the hazard warning mode is connected via the one switching level (B) to ground 31 by means of the connection line 6, the connection line 7 for the monitoring-lamp flasher unit is closed and simultaneously the connection of the hazard warning monitoring lamp 3 to the feed line 58d of the dimmed vehicle search light is disconnected as a result of the synchronous switching over of the two switching elements of the two-level switch 4.

Consequently, when hazard warning mode is activated, the hazard warning monitoring lamp 3 is switched on and off, flashing with the flashing frequency in synchronism with the flasher lamps (12 to 15), by one 8 of the flasher-unit driver outputs 8, 9. This hazard warning mode is maintained until the hazard warning activation switch 4 is switched back again into the position shown in the figure, after which the logic control input which activates the hazard warning mode is disconnected from the ground line 31 and the feeding of the hazard warning monitoring lamp 3 is switched over again to the feed line 58d of the dimmed vehicle search light.

It is clear that in the hazard warning system circuit described above, a separate short-circuit-proof output driver circuit for the hazard warning monitoring lamp 3 is not required since it is only fed from the flasher unit 2 when the hazard warning mode is activated, which takes place via an already existing driver output 8 for an intermittent actuation. Of course, the control logic 5 of the flasher unit 2 has actuation possibilities for executing a normal flasher mode which are not of interest here and are therefore not explicitly shown in the figure. In each case only one of the two flasher-unit output driver units 10, 11 are activated in the hazard warning mode so that in each case two of the four flasher units (12 to 15) are then activated in time with the flashing frequency.

By means of the described embodiment of the hazard warning activation switch, the actuation of the hazard warning monitoring lamp is decoupled from the flasher-unit driver output automatically and simultaneously with the deactivation of the hazard warning mode and is assumed by the signal of the dimmed vehicle search light. Therefore, as a result of the dissonnection of the connection line for the monitoring-lamp flashing unit, the hazard warning mode actuation of the hazard warning monitoring lamp by the flasher unit does not take place when the hazard warning mode is deactivated even if the associated flasher-unit driver output outputs a flasher signal to the two connected flasher lamps due to an activation of a normal flashing mode. Furthermore, it is clear that no positive voltage supply to the hazard warning activation switch, as is provided in the case of the known circuit mentioned at the beginning, is required for the above hazard warning system circuit.

Of course, the person skilled in the art is capable of performing modifications of the exemplary embodiment described for the best possible adaptation to the respective application within the scope of the invention. Thus, for example, the hazard warning activation switch can be one which, in addition to the two switching levels described, has further switching levels for other functions. Furthermore, the invention is not restricted to an application for motor vehicle hazard warning systems but rather can be usefully used in other systems with a monitoring lamp which does not absolutely need to be integrated in the housing of the activation switch. Here, the system can have one or more driver outputs with in each case one or more connected elements which can be operated intermittently.

What is claimed:

1. A circuit for a system having at least one element which can be operated intermittently, the circuit comprising:

a control device having a driver output, the at least one element being directly connected to the driver output;

an activation switch coupled to the control device for activating the control device;

a monitoring lamp coupled to the activation switch such that during an active intermittent operating mode of the at least one element, the monitoring lamp is operated by the control device in a first, intermittent state, via a connection line between the monitoring-lamp and the control device, and during a non-activated operating mode of the at least one element, the monitoring lamp is in a second operating state different from said first operating state;

wherein said connection line is connected to the driver output of the control device for the at least one element and said connection line directly connects the monitoring lamp with the driver output of the control device;

wherein the activation switch comprises a multi-level switch having at least two permanent switched positions such that the activation switch is looped with a first switching level (B) into a control line for activating the control device and with a second switching level (A) into the connection line; and wherein the intermittent operating mode of the at least one element is activated via one of the switched positions of the activation switch via the first switching level, and synchronously therewith a switching connection of the connection line is cancelled via the second switching level.

2. A circuit according to claim 1, further comprising:

a housing for the activation switch, said monitoring lamp being arranged in the housing.

3. A circuit according to claim 1, for use in a hazard warning system of a motor vehicle having a dimmed vehicle search light line and a flasher unit as the control device, wherein said monitoring lamp is a flasher monitoring lamp which is switched over via the second switching level (A) of the activation switch formed of a flasher actuation switch, said flasher monitoring lamp being connected either to a flasher-unit driver output for at least one flasher lamp as the at least one element which can be operated intermittently or to the dimmed vehicle search light line.

* * * * *